Dec. 29, 1925.

C. J. KERN 1,567,955

DRIVE STAND

Filed August 9, 1924    3 Sheets-Sheet 2

Inventor:
Conrad J. Kern
by his Attorneys
Howson &
Howson

Dec. 29, 1925.

C. J. KERN 1,567,955

DRIVE STAND

Filed August 9, 1924     3 Sheets-Sheet 3

Inventor:
Conrad J. Kern,
by his Attorneys,

Patented Dec. 29, 1925.

1,567,955

UNITED STATES PATENT OFFICE.

CONRAD J. KERN, OF PHILADELPHIA, PENNSYLVANIA, ASSIGNOR TO THE MOORE & WHITE COMPANY, OF PHILADELPHIA, PENNSYLVANIA, A CORPORATION OF PENNSYLVANIA.

DRIVE STAND.

Application filed August 9, 1924. Serial No. 731,195.

*To all whom it may concern:*

Be it known that I, CONRAD J. KERN, a citizen of the United States, residing in Philadelphia, Pennsylvania, have invented certain Improvements in Drive Stands, of which the following is a specification.

My invention relates to certain improvements in drive stands for driving paper machinery.

One object of my invention is to construct the drive stand so that the vibration will be materially reduced, preventing the breaking of the wet paper and snapping of dry paper, and to insure the steady drawing of the paper to avoid wrinkling.

A further object of the invention is to design the stand so that it will be compact, and will run with comparatively little noise.

The base of the drive stand is rectangular in shape. Mounted on the base is a housing 2, which encloses the gearing.

Figure 1:
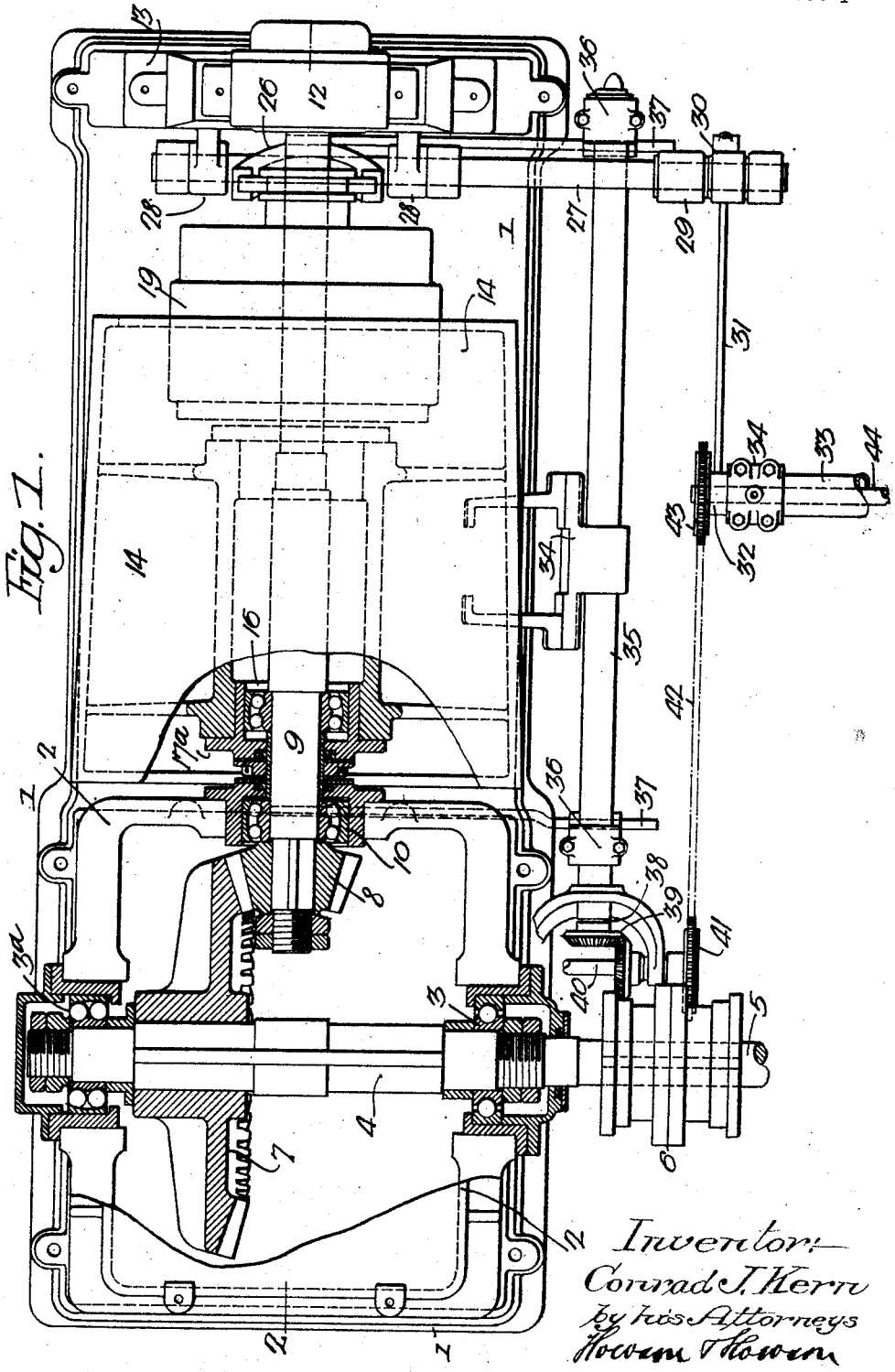
Figure 1 is a plan view partly in section illustrating my improved drive stand.

In the housing 2 are ball bearings 3, 3ª, for the shaft 4, connected to a driving shaft 5 through a flexible coupling 6 of any suitable construction. The ball bearing 3, nearest the coupling 6, has a single series of balls, while the ball bearing 3ª has two series of balls which are arranged to travel in a race that is curved transversely, as shown in Figure 1.

On the shaft 4 is a bevel gear wheel 7, having spirally arranged teeth, which mesh with the spiral teeth of a bevel pinion 8 on a longitudinal shaft 9.

The shaft 9 is mounted in a ball bearing 10, located in the housing 2. This bearing has two series of balls and is made substantially in the same manner as the ball bearing 3ª of the shaft 4. The end of the shaft 9, opposite that having the pinion thereon, is mounted in a ball bearing 11 having a single series of balls. This bearing 11 is mounted in a casing 12, which is secured to a pedestal 13 on the base 1.

Mounted on the shaft 9 is a wide cone pulley 14, designed for the reception of a wide belt.

Figure 2:
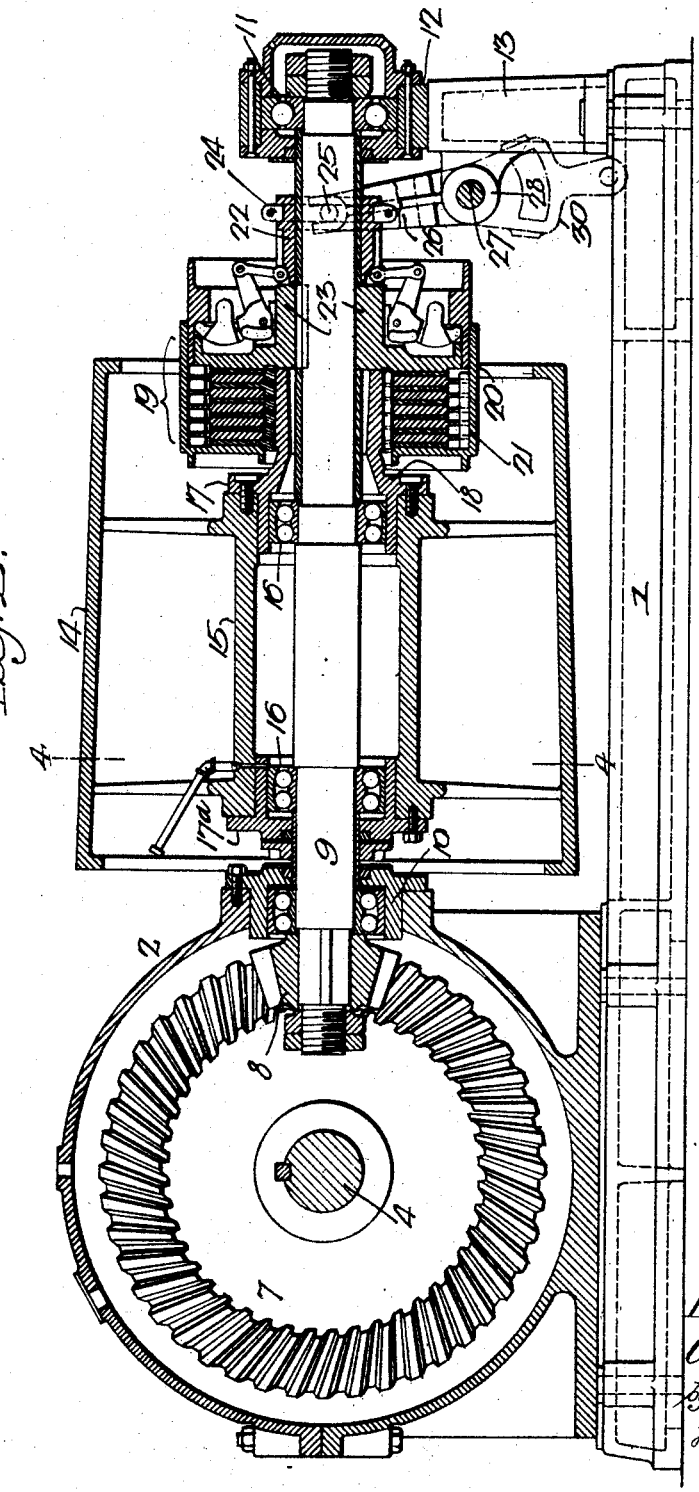
Fig. 2 is a longitudinal sectional view.
Figure 3:
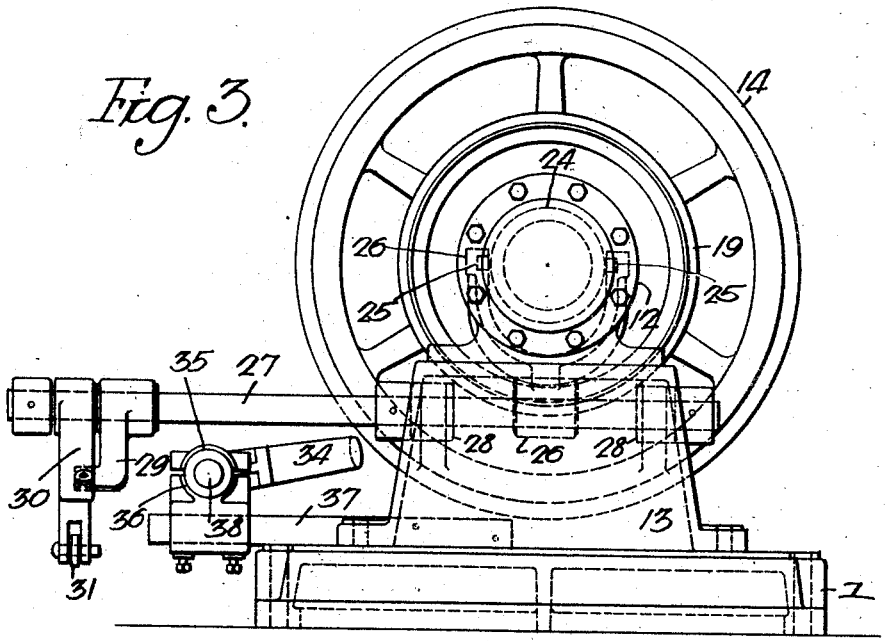
Fig. 3 is an end view.
Figure 4:
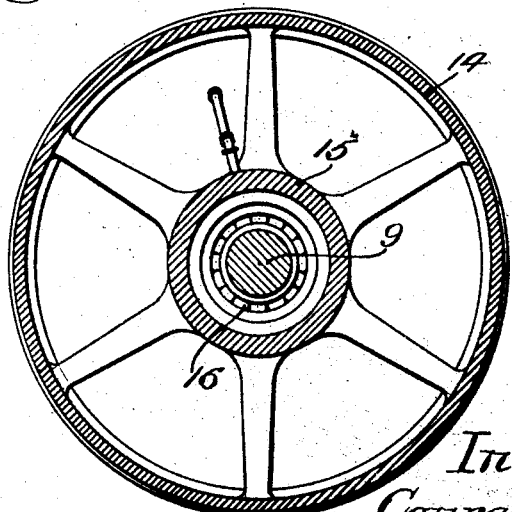
Fig. 4 is a transverse sectional view on the line 4—4, Fig. 2.

In the hub 15 of the pulley are two ball bearings 16, which support the cone pulley on the shaft 9. Each of these ball bearings has a double series of balls, as clearly shown in Figure 2. The casings 17 and 17ª of the ball bearings 16—16 extend into the hub 15 and are flanged. Screw bolts secure the flanges to the hub. The casing 17 is extended, as at 18, to form one member of a disk friction clutch 19. The other member 20 of the clutch is in the form of a drum. There are two series of disks 21 in the clutch. One series is arranged to turn with the drum, and the other series turns with the extension 18 of the casing 17.

Suitable lever mechanism connected to a sleeve 22 is actuated to cause the disks to come into frictional contact. The drum 19 is mounted on a hub 23, which is splined to the shaft 9. Bushings are located on the shaft at each end of the hub 23 so that the hub is held in position on the shaft.

The sleeve 22 has an annular groove to receive the shifter ring 24, which has pins 25. The pins 25 are engaged by a forked shifting arm 26 secured to a rock shaft 27, mounted in bearings 28. On the outer end of this shaft is an arm 29, which is engaged by a rocker arm 30, loose on the shaft. This rocker arm 30 is connected by a rod 31 to an arm 32 on an operating rock shaft 33, mounted in a bearing 34. By operating the rock shaft, the cone pulley 14 can be clutched to, or released from, the shaft 9.

In order to shift the belt on the cone pulley 14 a shifter 34 is provided, having arms which extend on each side of the belt. This shifter is mounted on a longitudinal support 35 carried by bearings 36, adjustably mounted on bars 37. The shifter 34 is moved longitudinally on the support 35 by a screw shaft 38, which extends through the support and engages the shifter. On one end of the screw shaft is a bevel gear wheel 39, which meshes with a similar bevel wheel on a shaft 40, having a sprocket wheel 41, around which passes a chain 42 from a sprocket wheel 43 on an operating shaft 44, which extends through the operating rock shaft 33. On turning the shaft 44, the shifter can be moved to shift the belt on the cone pulley 14.

By the construction hereinbefore described, the drive stand can be made compact and substantial, and, owing to the arrangement of the ball bearings and the spiral gears, the vibration is greatly reduced.

I claim:

The combination in a drive stand for paper and like machinery of a base; a housing; a transverse shaft mounted in bearings in the housing; a longitudinal shaft having one bearing in the housing; a pedestal supported in the opposite end of the shaft; a long cone pulley loosely mounted on the shaft; ball bearings between the pulley and the shaft; clutch mechanism arranged to couple the shaft and the cone pulley; means for actuating the clutch; a belt shifter arranged to shift a belt on the cone pulley; a hollow shaft for operating the clutch; and a shaft extending through the hollow shaft for operating the belt shifter.

CONRAD J. KERN.